(12) United States Patent
Fezer

(10) Patent No.: US 7,798,116 B2
(45) Date of Patent: Sep. 21, 2010

(54) PISTON/CONNECTING ROD ASSEMBLY FOR AN INTERNAL COMBUSTION ENGINE

(75) Inventor: Eberhard Fezer, Rudersberg-Steinenberg (DE)

(73) Assignee: MAHLE International GmbH, Stuttgart (DE)

(*) Notice: Subject to any disclaimer, the term of this patent is extended or adjusted under 35 U.S.C. 154(b) by 267 days.

(21) Appl. No.: 12/086,991

(22) PCT Filed: Dec. 20, 2006

(86) PCT No.: PCT/DE2006/002273

§ 371 (c)(1),
(2), (4) Date: Jul. 31, 2008

(87) PCT Pub. No.: WO2007/071234

PCT Pub. Date: Jun. 28, 2007

(65) Prior Publication Data

US 2009/0007881 A1    Jan. 8, 2009

(30) Foreign Application Priority Data

Dec. 23, 2005  (DE) .................. 10 2005 061 898

(51) Int. Cl.
*F02F 3/00* (2006.01)
*F01M 1/02* (2006.01)
*F02B 75/32* (2006.01)

(52) U.S. Cl. .................. 123/193.6; 123/196 R; 123/197.2; 184/24

(58) Field of Classification Search ............. 123/196 R, 123/196 M, 41.35, 193.6, 197.2; 184/24
See application file for complete search history.

(56) References Cited

U.S. PATENT DOCUMENTS

| 3,179,021 A | 4/1965 | Holcombe |
| 3,402,643 A | 9/1968 | Maat |
| 3,626,815 A | 12/1971 | Fingeroot et al. |
| 4,667,577 A | 5/1987 | Rösch |
| 5,630,391 A | 5/1997 | Anderson et al. |
| 6,279,456 B1 | 8/2001 | Ueshima et al. |
| 7,278,390 B2 | 10/2007 | Fezer |

FOREIGN PATENT DOCUMENTS

| DE | 32 17 595 | 11/1983 |
| DE | 33 42 528 | 2/1985 |
| DE | 36 00 750 | 7/1987 |
| DE | 36 09 019 | 9/1987 |
| DE | 43 42 044 | 6/1995 |
| DE | 101 01 605 | 7/2002 |
| DE | 102 55 732 | 6/2004 |
| GB | 1 093 693 | 12/1967 |

OTHER PUBLICATIONS

International Search Report.

*Primary Examiner*—Noah Kamen
(74) *Attorney, Agent, or Firm*—Collard & Roe, P.C.

(57) ABSTRACT

A piston/connecting rod arrangement for an internal combustion engine has a piston upper part with hub supports which lie opposite one another and have hubs and hub holes which delimit a recess, in which the small connecting-rod eye of a connecting rod is arranged. A piston pin is mounted in the small connecting-rod eye and the hub holes. There is at least one oil-guiding face to be provided on that face of the hub support which faces the recess. At least one oil-guiding face opens into at least one oil-collecting space which is arranged in the hub hole, in such a way that the oil-guiding face guides oil into the oil-collecting space.

8 Claims, 4 Drawing Sheets

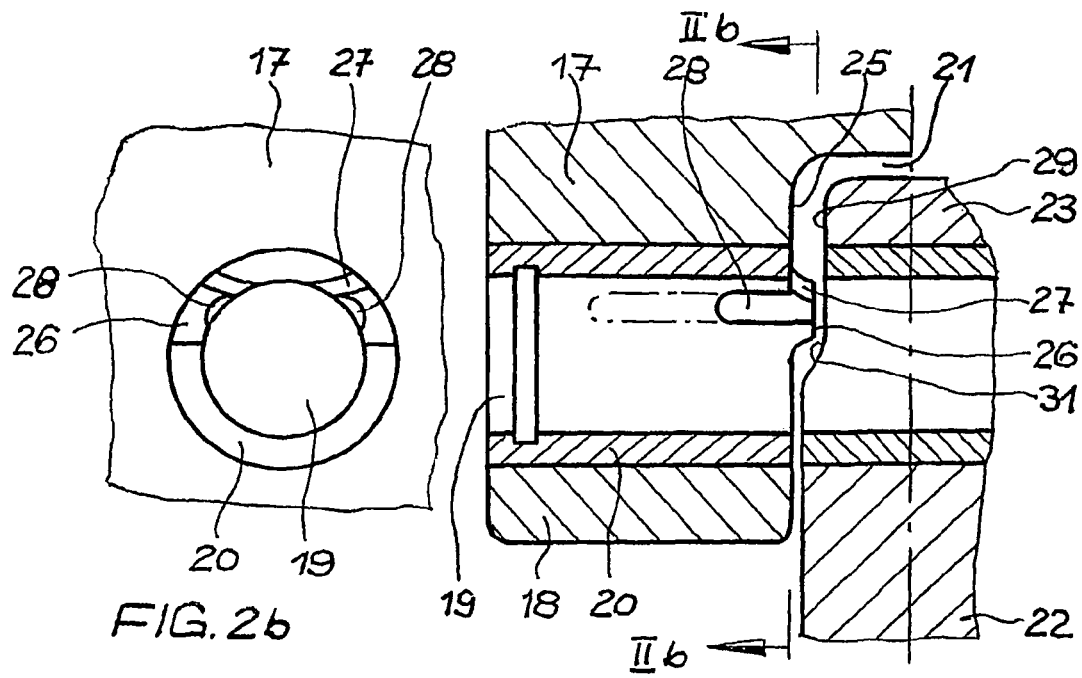
FIG. 2b
FIG. 2a
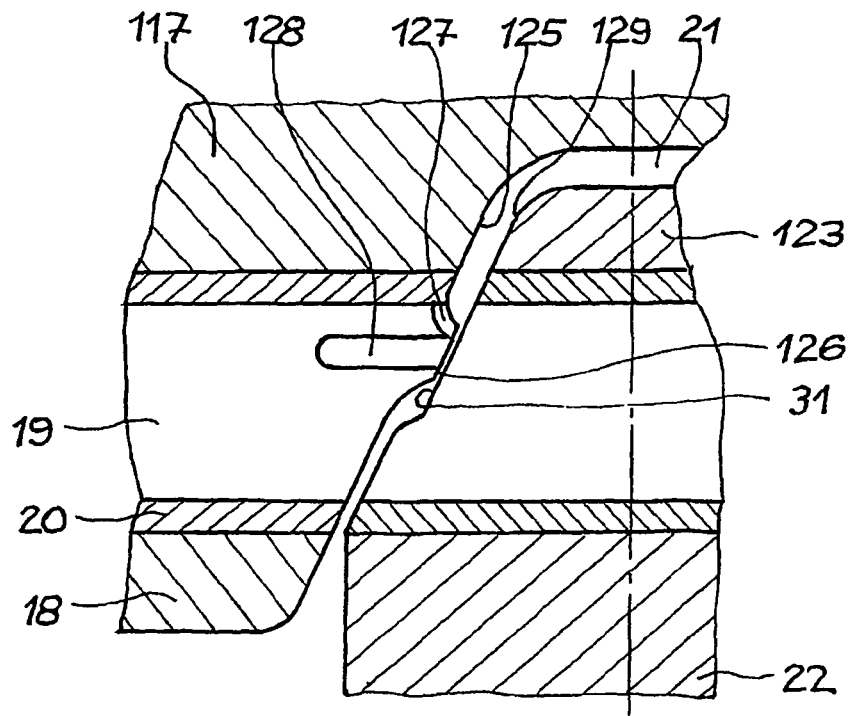
FIG. 3

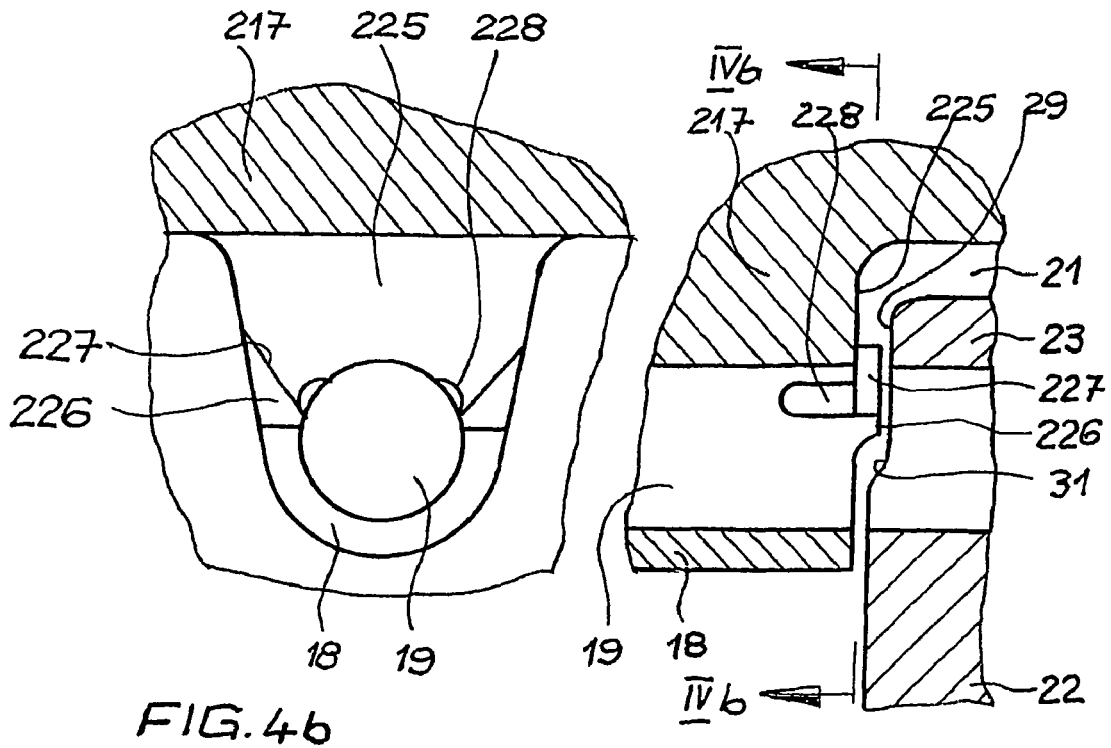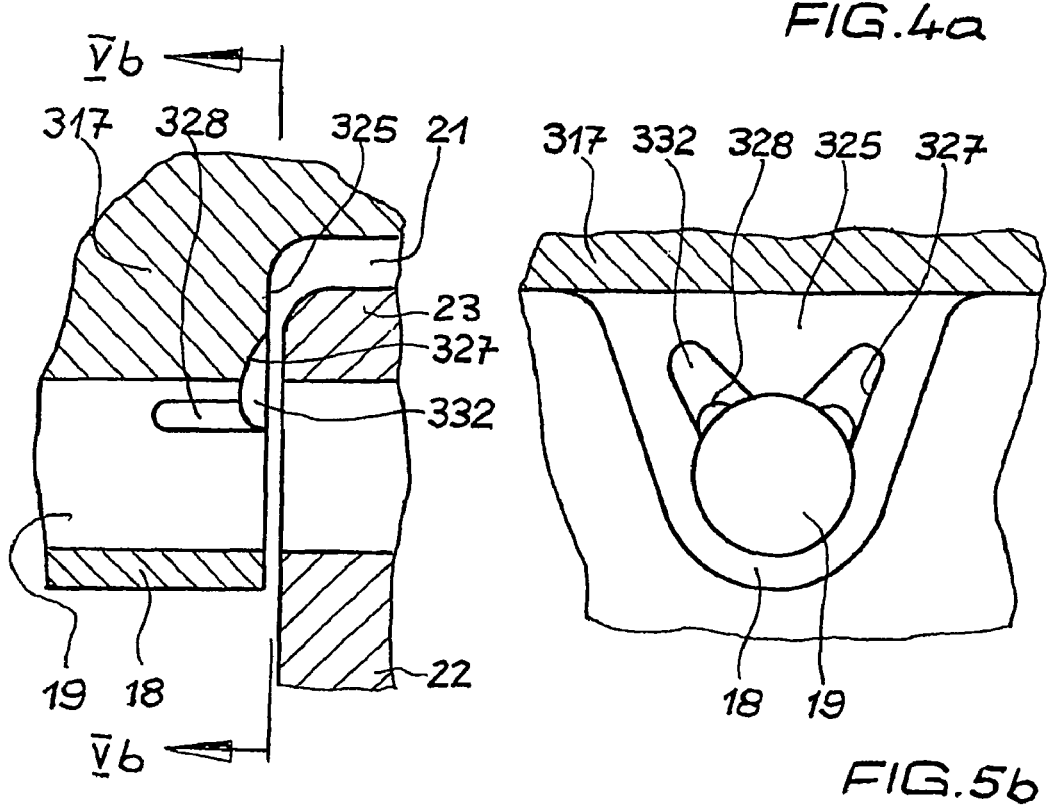

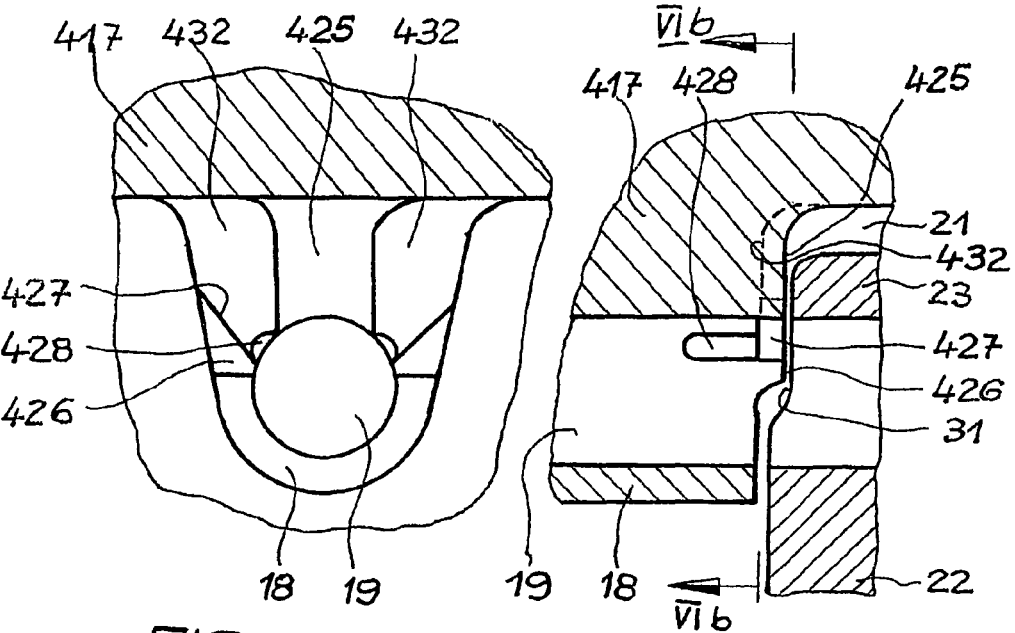
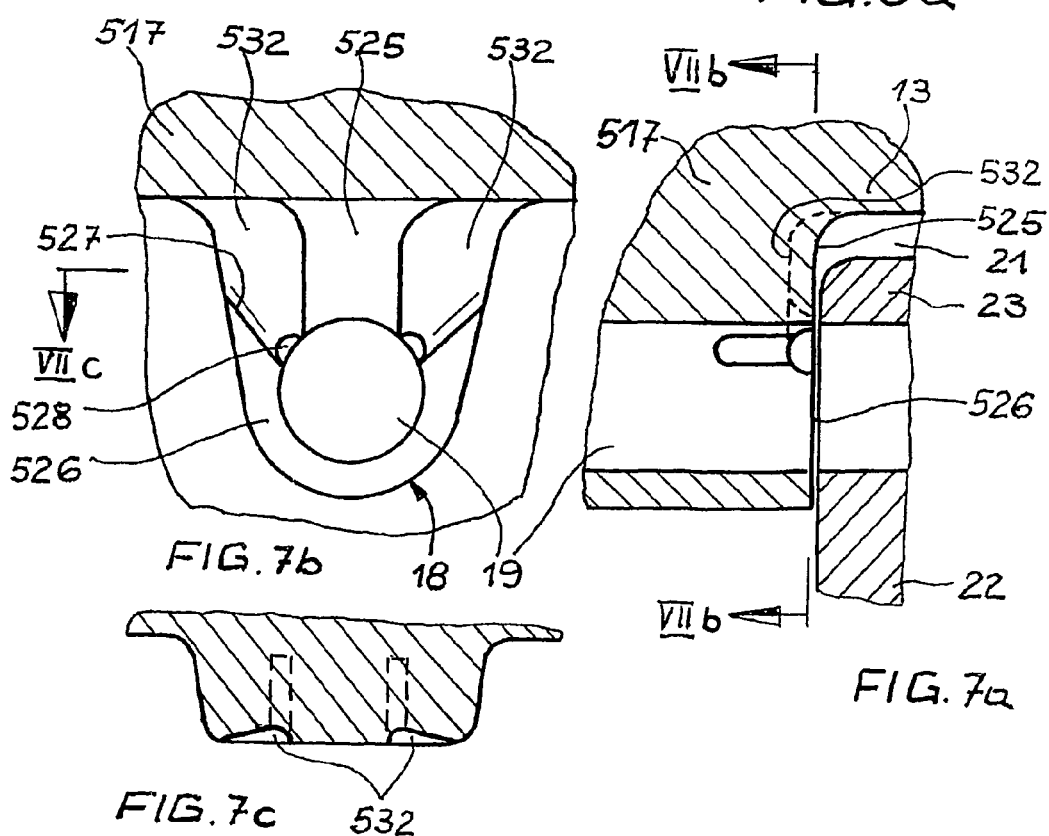

PISTON/CONNECTING ROD ASSEMBLY FOR AN INTERNAL COMBUSTION ENGINE

CROSS REFERENCE TO RELATED APPLICATIONS

This application is the National Stage of PCT/DE2006/002273 filed on Dec. 20, 2006, which claims priority under 35 U.S.C. §119 of German Application No. 10 2005 061 898.7 filed on Dec. 23, 2005. The international application under PCT article 21(2) was not published in English.

BACKGROUND OF THE INVENTION

The present invention relates to a piston/connecting rod assembly for an internal combustion engine, having an upper piston part comprising pin boss supports that lie opposite one another, having pin bosses and pin bores, which delimit a recess in which the small connecting rod eye of a connecting rod is disposed, whereby a piston pin is mounted in the small connecting rod eye and the pin bores.

In the case of piston/connecting rod assemblies of the type stated, sufficient lubrication of the piston pin bearing in the pin bores must be assured. In the case of diesel engines, in particular, seizing occurs in individual cases, under greater stresses, and this is supposed to be prevented by means of sufficient lubrication of the pin bores. DE 36 00 750 A1 suggests creating circumferential oil chambers within the guide surfaces, in the case of a connecting rod guidance device, which chambers are supplied with oil from the crankcase, by way of the set-back lower pin boss face sides. According to DE 36 09 019 C1, pockets formed into the pin bore are to be supplied with oil by means of an oil feed through the connecting rod. DE 32 17 595 A1 also discloses an oil feed through the connecting rod, whereby pockets that correspond with one another are formed in the walls of connecting rod eye and pin bores, in which pockets the oil is transported out of the connecting rod eye into the pin bore. DE 43 42 044 A1 shows a piston/connecting rod assembly having a depression on the inside of the piston crown, in which oil collects during engine operation, which is guided into the pin bore, in each instance, by means of a recess on the inside of every pin boss. However, these solutions are complicated in terms of design, and it is difficult to adapt them to different piston/connecting rod assemblies of different engine types.

The task of the present invention consists in making available a piston/connecting rod assembly that allows sufficient lubrication of the piston pin bearing in the pin bores, while having a simple configuration, in terms of design.

SUMMARY OF THE INVENTION

According to the invention, it is provided that at least one oil guide surface is provided on the surface of at least one pin boss support that faces the recess, which oil guide surface ends in at least one oil collection chamber disposed in the pin bore, in such a manner that the at least one oil guide surface guides oil into the oil collection chamber.

In the case of the piston/connecting rod assembly according to the invention, oil feed through the connecting rod is made unnecessary. The oil feed into the recess, which might be provided in any case, is sufficient. The oil injected into the recess bounces off the underside of the piston crown, and is guided into the oil collection chamber(s) in the pin bore, in targeted manner, by means of the at least one oil guide surface. Efficient lubrication of the piston pin bearing in the pin bores results from this. The piston/connecting rod assembly according to the invention is accordingly particularly low in friction wear, and allows particularly good operational security and reliability, particularly in extreme situations, such as cold-start driving operation or under peak stresses, for example. The piston/connecting rod assembly according to the invention is furthermore characterized by a particularly simple design, which can be adapted to the most varied piston and engine types.

Advantageous further developments are evident from the dependent claims.

Of course, pin boss liners can be provided in the pin bores, in known manner. Then the surfaces of the pin boss supports that face the recess are partly formed by the face surfaces of the pin boss liners. In this case, it is practical that the oil guide surface is provided at least in the face surface of the pin boss liner, and extends into the surface of the pin boss support, if necessary. The at least one oil collection chamber is then configured in the pin boss liner, accordingly.

The oil guide surface provided on the at least one surface of a pin boss support can form an elevation or a depression. The only essential thing in this connection is that a defined surface is offered to the oil, on which it can move toward the pin bores and the oil collection chambers provided in them, in targeted manner, thanks to the mass and adhesion forces that are in effect.

If the oil guide surface is configured as an elevation, it can be necessary or practical that a set-back step is provided in the related face surface of the small connecting rod eye, in the region of this oil guide surface, in order to create sufficient space for the oil guide surface.

The pin boss supports can be configured in any desired manner, particularly as a trapezoid support or as a block support. This again shows the particular flexibility of the piston/connecting rod assembly according to the invention. If the pin boss supports are configured as trapezoid supports, the face surfaces of the small connecting rod eye should be adapted to the progression of the related surface of the pin boss support, for practical purposes.

All of the design characteristics such as elevation and depression, block support and trapezoid support, pin bores with and without pin boss liners, can, of course, be combined with one another in any desired manner within the framework of the invention. The piston/connecting rod assembly according to the invention, with all its variants, can therefore be applied to block supports and trapezoid supports as well as to embodiments with or without pin boss liners.

BRIEF DESCRIPTION OF THE DRAWINGS

An exemplary embodiment of the invention will be described in greater detail below, using the attached drawings. These show, in a schematic representation, not to scale:

FIG. 2a a first exemplary embodiment of a piston/connecting rod assembly according to the invention, in a partial representation, in section;

FIG. 2b a section along the line IIb-IIb in FIG. 2a;

FIG. 3 another exemplary embodiment of a piston/connecting rod assembly, in a partial representation, in section;

FIG. 4a another exemplary embodiment of a piston/connecting rod assembly according to the invention, in a partial representation, in section;

FIG. 4b a section along the line IVb-IVb in FIG. 4a;

FIG. 5a another exemplary embodiment of a piston/connecting rod assembly according to the invention, in a partial representation, in section;

FIG. 5b a section along the line Vb-Vb in FIG. 5a;

FIG. 6a another exemplary embodiment of a piston/connecting rod assembly according to the invention, in a partial representation, in section;

FIG. 6b a section along the line VIb-VIb in FIG. 6a;

FIG. 7a another exemplary embodiment of a piston/connecting rod assembly according to the invention, in a partial representation, in section;

FIG. 7b a section along the line VIIb-VIIb in FIG. 7a;

FIG. 7c a section along the line VIIc-VIIc in FIG. 7b.

DETAILED DESCRIPTION OF THE DRAWINGS

Figure 1:
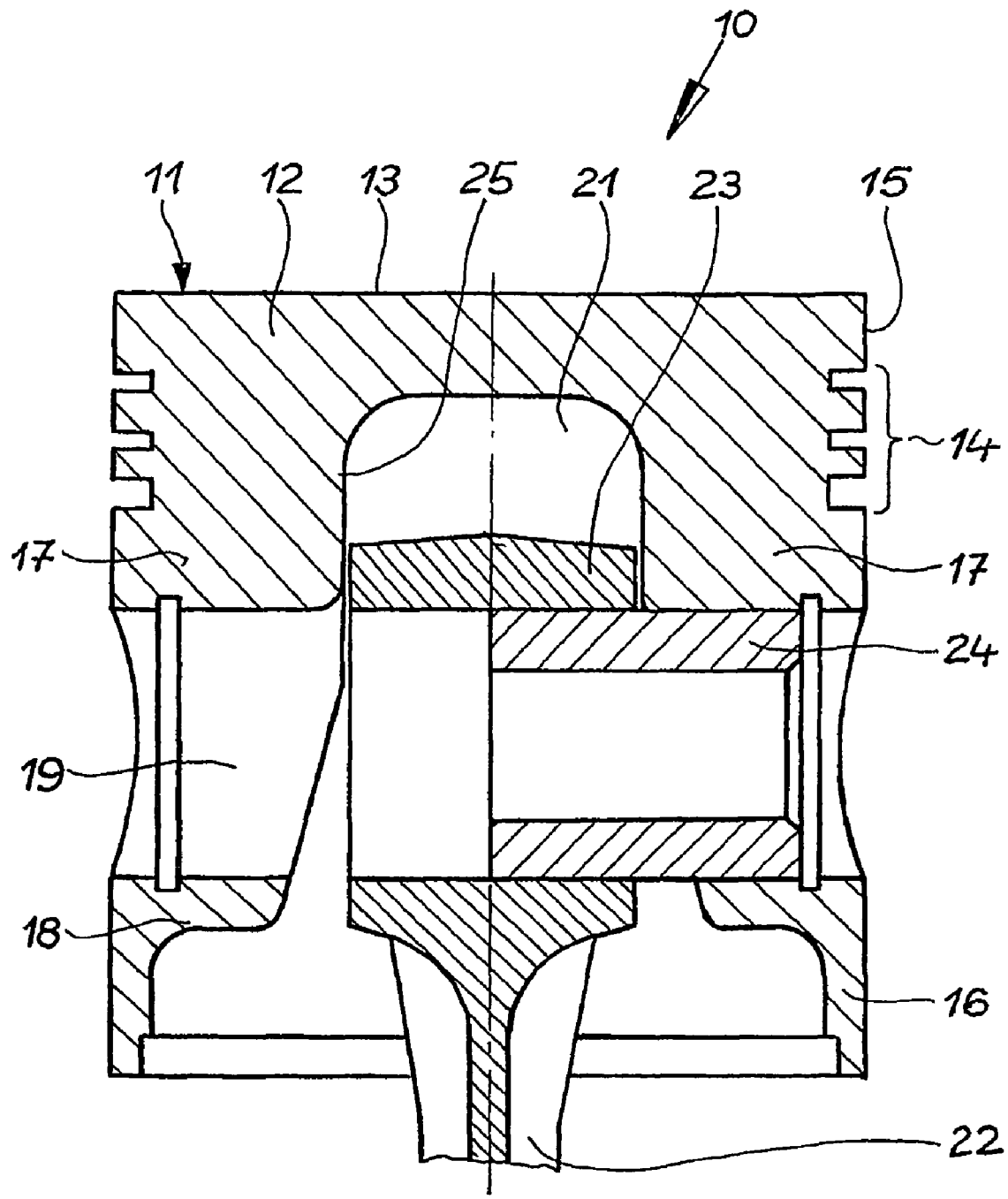
FIG. 1 a sectional representation of a conventional piston/connecting rod assembly, whereby the piston pin is shown only in the right half.

FIG. 1, as an overview representation, shows a piston/connecting rod assembly 10, having a piston 11, comprising an upper piston part 12 having a piston crown 13 and a circumferential ring belt 14 with top land 15 on the mantle surface. Furthermore, the piston skirt 16 is indicated. Two pin boss supports 17 (trapezoid supports in the exemplary embodiment) for pin bosses 18 with pin bores 19, which lie opposite one another, are provided on the underside of the piston crown 13. The pin boss supports 17, with their surfaces 25, delimit a recess 21, in which the small connecting rod eye 23 of a connecting rod 22 is disposed. A piston pin 24 is mounted in the pin bores 19 and the small connecting rod eye 23. The configuration of the piston/connecting rod assembly 10 according to the invention is shown in detail in the following figures.

FIG. 2a, 2b, each in a partial representation, show a first exemplary embodiment of a piston/connecting rod assembly according to the invention, whose pin bores 19 are provided with a pin boss liner 20, in each instance. In order to achieve the improved lubrication of the piston pin bearing in the pin bores 19, in accordance with the task, an elevation 26 is configured in the surface 25 of every pin boss support 17 (a block support in this exemplary embodiment) that faces the recess 21, in each instance, on both sides of the pin bore 19. In the exemplary embodiment, the elevation 26 is configured in the face surface of the pin boss liner 20 that forms part of the surface 25. The elevation 26 has an oil guide surface 27, which represents a slanted plane that drops in the direction of the pin bore 19, in the exemplary embodiment. The oil guide surface 27 ends in an oil collection chamber 28, which is configured as a pocket formed into the pin boss liner 20 in this exemplary embodiment. A set-back step 31 is provided in the related face surface 29 of the small connecting rod eye 23, in the region of the oil guide surface 27. The oil is sprayed against the underside of the piston crown 13, in known manner. Part of the oil runs down the surface 25 of the pin boss support 17, and gets onto the oil guide surface 27, which guides the oil that runs along it into the oil collection chamber 28. In this way, effective and reliable lubrication of the piston pin bearing in the pin bore 19 is achieved.

FIG. 3, in a partial representation, shows another exemplary embodiment of a piston/connecting rod assembly according to the invention, whereby the same components have been provided with the same reference symbols. The pin bores 19 are also provided with a pin boss liner 20, in each instance. To lubricate the piston pin bearing in the pin bores, an elevation 126 is also configured on both sides of the pin bore 19, in each instance, in the surface 125 of each pin boss support 117 (a trapezoid support in this exemplary embodiment) that faces the recess 21. In the exemplary embodiment, the elevation 126 is configured in the face surface of the pin boss liner 20 that forms part of the surface 125. The elevation 126 has an oil guide surface 127, which represents a slanted plane that drops in the direction of the pin bore 19, in the exemplary embodiment. The oil guide surface 127 is longer than the oil guide surface 27 shown in FIG. 2a, 2b. The oil guide surface 127 ends in an oil collection chamber 128, which is configured as a pocket formed into the pin boss liner 20 in this exemplary embodiment. A set-back step 31 is provided in the related face surface 129 of the small connecting rod eye 123, in the region of the oil guide surface 127. For the remainder, the face surface 129 of the small connecting rod eye 123 is adapted to the progression of the related surface 125 of the pin boss support 117. The oil supply takes place in the same way as described for the exemplary embodiment shown in FIG. 2a, 2b.

FIG. 4a, 4b, each in a partial representation, show another exemplary embodiment of a piston/connecting rod assembly according to the invention, whose pin bores 19 do not have a pin boss liner. In order to achieve the improved lubrication of the piston pin bearing in the pin bores 19, in accordance with the task, an elevation 226 is configured in the surface 225 of every pin boss support 217 (a block support in this exemplary embodiment) that faces the recess 21, in each instance, on both sides of the pin bore 19. In the exemplary embodiment, the elevation 226 is exclusively configured in the surface 225. The elevation 226 has an oil guide surface 227, which represents a slanted plane that drops in the direction of the pin bore 19, in the exemplary embodiment. The oil guide surface 227 ends in an oil collection chamber 228, which is configured as a pocket formed into the wall of the pin bore 19 in this exemplary embodiment. A set-back step 31 is provided in the related face surface 29 of the small connecting rod eye 23, in the region of the oil guide surface 227. The oil is sprayed against the underside of the piston crown 13, in known manner. Part of the oil runs down the surface 225 of the pin boss support 217, and gets onto the oil guide surface 227, which guides the oil that runs along it into the oil collection chamber 228. In this way, effective and reliable lubrication of the piston pin bearing in the pin bore 19 is achieved.

FIG. 5a, 5b, each in a partial representation, show another exemplary embodiment of a piston/connecting rod assembly according to the invention, whose pin bores 19 also do not have a pin boss liner. In order to achieve the improved lubrication of the piston pin bearing in the pin bores 19, in accordance with the task, a depression 332 is configured in the surface 325 of every pin boss support 317 (a block support in this exemplary embodiment) that faces the recess 21, in each instance, on both sides of the pin bore 19. In the exemplary embodiment, the depression 332 is exclusively configured in the surface 325. The depression 332 has an oil guide surface 327, which represents a concave surface inclined in the direction of the pin bore 19, in the exemplary embodiment. The oil guide surface 327 ends in an oil collection chamber 328, which is configured as a pocket formed into the wall of the pin bore 19 in this exemplary embodiment. The oil is sprayed against the underside of the piston crown 13, in known manner. Part of the oil runs down the surface 325 of the pin boss support 317, and gets onto the oil guide surface 327, which guides the oil that runs along it into the oil collection chamber 328. In this way, effective and reliable lubrication of the piston pin bearing in the pin bore 19 is achieved.

FIG. 6a, 6b, each in a partial representation, show another exemplary embodiment of a piston/connecting rod assembly according to the invention, whose pin bores 19 also do not have a pin boss liner. In order to achieve the improved lubrication of the piston pin bearing in the pin bores 19, in accordance with the task, two depressions 432 are configured in the surface 425 of every pin boss support 417 (a block support in this exemplary embodiment) that faces the recess 21, in each instance, on both sides of the pin bore 19. In the exemplary embodiment, the depressions 432 are exclusively configured in the surface 425, in the form of channels that extend from the underside of the piston crown 13 all the way to the pin bore 19. The depressions 432 each end in an oil collection chamber 428, which is configured as a pocket formed into the wall of the pin bore 19 in this exemplary embodiment. At the same time, elevations 426 are configured in the surface 425 of each pin boss support 417, below each depression 432. The elevations 426 have oil guide surfaces 427, which have the same height as the surface 425 in the exemplary embodiment, and represent a slanted plane that drops in the direction of the pin bores 19. The oil guide surfaces 427 also end in the oil collection chambers 428. In the region of the oil guide surfaces 427, a set-back step 31 is provided in the related face surface 29 of the small connecting rod eye 23, in each instance. The oil is sprayed against the underside of the piston crown 13, in known manner. Lubricant oil is collected in the depressions 432. Part of the lubricant oil runs directly into the collection chambers 428. The rest of the lubricant oil is guided onto the oil guide surfaces 427, in targeted manner, and from there runs into the oil collection chambers 428. By means of the combination of the depressions 432 with the oil guide surfaces 427, particularly strong and effective lubrication of the piston pin bearing in the pin bore 19 is achieved.

FIGS. 7a, 7b, and 7c, each in a partial representation, show another exemplary embodiment of a piston/connecting rod assembly according to the invention, whose pin bores 19 also do not have a pin boss liner. In order to achieve the improved lubrication of the piston pin bearing in the pin bores 19, in accordance with the task, two depressions 532 are again configured in the surface 525 of every pin boss support 517 (a block support in this exemplary embodiment) that faces the recess 21, in each instance, on both sides of the pin bore 19, in the form of channels that extend from the underside of the piston crown 13 all the way to the pin bore 19. The depressions 532 each end in an oil collection chamber 528, which is configured as a pocket formed into the wall of the pin bore 19 in this exemplary embodiment. From FIG. 7c, it is evident that the depressions 532 configured to run out at a slant toward the outside, in cross-section, so that the support surface of the pin boss support 517 is impaired as little as possible. At the same time, an elevation 526 that runs around the pin bore 19 is configured along the pin boss 18, below the depressions 532. The elevation 526 ends below the depressions 532 in oil guide surfaces 527, which represent a slanted plane that drops in the direction of the pin bore 19, in the exemplary embodiment. The oil guide surfaces 527 also end in the oil collection chambers 528. The oil is sprayed against the underside of the piston crown 13, in known manner. Lubricant oil is collected in the depressions 532. Part of the lubricant oil runs directly into the collection chambers 528. The rest of the lubricant oil is guided onto the oil guide surfaces 527, in targeted manner, and from there runs into the oil collection chambers 528. By means of the combination of the depressions 532 with the oil guide surfaces 527, particularly strong and effective lubrication of the piston pin bearing in the pin bore 19 is achieved.

The invention claimed is:

1. Piston/connecting rod assembly (10) for an internal combustion engine, having an upper piston part (12) comprising pin boss supports (17, 117, 217, 317, 417, 517) that lie opposite one another, having pin bosses (18) and pin bores (19), which delimit a recess (21) in which the small connecting rod eye (23, 123) of a connecting rod (22) is disposed, whereby a piston pin is mounted in the small connecting rod eye (23, 123) and the pin bores (19), wherein at least one oil guide surface (27, 127, 227, 327, 427, 527) is provided on the surface (25, 125, 225, 325, 425, 525) of at least one pin boss support (17, 117, 217, 317, 417, 517) that faces the recess (21), ending in at least one oil collection chamber (28, 128, 228, 328, 428, 528) disposed in the pin bore (19), in such a manner that the at least one oil guide surface (27, 127, 227, 327, 427, 527) guides oil into the at least one oil collection chamber (28, 128, 228, 328, 428, 528).

2. Piston/connecting rod assembly according to claim 1, wherein the at least surface (25, 125, 225, 325, 425, 525) of a pin boss support (17, 117, 217, 317, 417, 517) is partly formed by the face surface of a pin boss liner (20), that the oil guide surface (27, 127, 227, 327, 427, 527) is provided at least in the face surface of the pin boss liner (20), and that the at least one oil collection chamber (28, 128, 228, 328, 428, 528) is configured in the pin boss liner (20), in each instance.

3. Piston/connecting rod assembly according to claim 1, wherein the oil guide surface (27, 127, 227, 427) provided on the at least one surface (25, 125, 225, 425) of a pin boss support (17, 117, 217, 417) forms an elevation (26, 126, 226, 426).

4. Piston/connecting rod assembly according to claim 3, wherein in the region of the oil guide surface (27, 127, 227, 427) configured as an elevation (26, 126, 226, 426), a set-back step (31) is provided in the related face surface (29, 129) of the small connecting rod eye (23, 123).

5. Piston/connecting rod assembly according to claim 1, wherein the oil guide surface (27, 127, 227, 327, 427, 527) provided on the at least one surface (25, 125, 225, 325, 425, 525) of a pin boss support (17, 117, 217, 317, 417, 517) forms a depression (332, 432, 532).

6. Piston/connecting rod assembly according to claim 5, wherein the depression (532) is configured so that it runs out at a slant toward the outside, in cross-section.

7. Piston/connecting rod assembly according to claim 1, wherein every pin boss support (117) is configured as a trapezoid support, and that every face surface (129) of the small connecting rod eye (123) is adapted to the progression of the related surface of the pin boss support (117).

8. Piston/connecting rod assembly according to claim 1, wherein every pin boss support (17, 217, 317, 417, 517) is configured as a block support.

* * * * *